United States Patent
Gros et al.

(10) Patent No.: US 7,231,483 B2
(45) Date of Patent: *Jun. 12, 2007

(54) BUS STATION WITH INTEGRATED BUS MONITOR FUNCTION

(75) Inventors: Thomas Gros, Neustadt (DE); Fridolin Faist, Oberwolfach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/349,313

(22) Filed: Feb. 6, 2006

(65) Prior Publication Data

US 2006/0136648 A1 Jun. 22, 2006

Related U.S. Application Data (63) Continuation of application No. 10/623,199, filed on Jul. 18, 2003, now Pat. No. 7,024,508.

(60) Provisional application No. 60/397,558, filed on Jul. 18, 2002.

(51) Int. Cl.
*G01D 3/00* (2006.01)
*G01M 19/00* (2006.01)
*G06F 15/00* (2006.01)
*G06F 19/00* (2006.01)
*H04B 17/00* (2006.01)
*G01R 11/00* (2006.01)
*G01D 1/00* (2006.01)

(52) U.S. Cl. ............... 710/305; 709/224; 370/245; 702/127

(58) Field of Classification Search ........... 710/305, 710/105, 15, 306; 709/224, 217, 249; 370/245, 370/252, 451, 401, 402, 465; 713/153, 154; 702/122, 190, 1, 108, 127; 714/47, 799
See application file for complete search history.

(56) References Cited

U.S. PATENT DOCUMENTS

| 4,435,759 | A | * | 3/1984 | Baum et al. | 714/44 |
|---|---|---|---|---|---|
| 4,817,080 | A | * | 3/1989 | Soha | 370/252 |
| 5,699,348 | A | * | 12/1997 | Baidon et al. | 370/242 |
| 5,748,508 | A | * | 5/1998 | Baleanu | 703/13 |
| 5,793,963 | A | * | 8/1998 | Tapperson et al. | 709/201 |
| 5,796,721 | A | * | 8/1998 | Gretta, Jr. | 370/245 |
| 6,108,782 | A | * | 8/2000 | Fletcher et al. | 713/153 |
| 6,112,241 | A | * | 8/2000 | Abdelnour et al. | 709/224 |
| 6,279,037 | B1 | * | 8/2001 | Tams et al. | 709/224 |
| 7,024,508 | B2 | * | 4/2006 | Gros et al. | 710/305 |
| 2002/0120671 | A1 | * | 8/2002 | Daffner et al. | 709/201 |

OTHER PUBLICATIONS

"An automatic measurement system for electromechanical characterization of silicon pressure sensors" by Gong et al. (abstract only) Publication Date: Feb. 1996.*

* cited by examiner

*Primary Examiner*—Gopal C. Ray
(74) *Attorney, Agent, or Firm*—Fay Kaplun & Marcin, LLP (57) ABSTRACT

Described is a bus station (e.g., a sensor, an actuator, a gateway) which performs a primary device function and a secondary function (e.g., a bus monitor function). To perform the secondary function, the bus station is equipped with a bus monitor arrangement which allows the bus station to access, to detect and to further process telegram traffic carried on the bus system. Also described is a network equipped with a plurality of such bus stations and a method for carrying out such monitoring with the aid of the bus stations.

18 Claims, 11 Drawing Sheets

```
┌─────────────────────────────────────────────────────────────┐
│ 🖳 VVO-Monitor <C:\Vega\VVO_281\vvo.vvm> OFFLINE            │
│ File  Opinion  Filter  Options  Time  Info                  │
├──────────────────────────────────┬──────────────────────────┤
│ STOP   R E Q U E S T             │      A N S W E R         │
│                                  │                          │
│ 13:36:08.000  19.02.02 │CRC│ │000002│ │13:36:08.000 19.02.02│ │CRC│
│                                  │                          │
│ SER#:00000000  A#:000  GOP:Upload│ A#:000   L:13            │
│ L:12  N_G_ADR:0                  │                          │
│                                  │ P 001/002: STATUS:000    │
│ P 001/002: Series number [019]   │ <Series number>          │
│ Component_Nr          :000       │ 00009937170              │
│ SE_TYP                :000       │                          │
│ <Series number>                  │ P 002/002:    STATUS:000 │
│                                  │ <Revision_Data>          │
│ P 002/002: Software_Revision [112]│ 001  020  000           │
│ <Revision_Data>                  │                          │
└──────────────────────────────────┴──────────────────────────┘
```

BUS STATION WITH INTEGRATED BUS MONITOR FUNCTION

PRIORITY CLAIM

This application is a Continuation application of U.S. patent application Ser. No. 10/623,199 filed on Jul. 18, 2003 now U.S. Pat. No. 7,024,508 which claims the benefit of U.S. Provisional Patent Application Ser. No. 60/397,558 filed on Jul. 18, 2002; the specifications of both applications are expressly incorporated herein, in their entirety, by reference.

TECHNICAL FIELD

The present invention relates to a bus station for integration into a bus system or for connection to a bus system. Furthermore, the present invention relates to a network with at least one such bus station and the use of such bus station for monitoring a bus system.

A bus station provides other bus subscribers or bus stations via the bus system with process data or signals in the form of telegrams. Corresponding data and signals are preferably received by such bus station via the bus system. In particular, the present invention relates to a bus station in the field of filling level or pressure measurement technology integrated in, or coupled to, a field bus system such as a Profibus PA to communicate digitally with other bus stations coupled to the bus system. In particular, this also allows the bus system to be monitored.

Bus stations that could be mentioned in the context of the present invention are in particular sensors, actuators, control units, gateways, bridges, couplers and other units of the actorics or sensorics intended for coupling to a bus system and communicating via the bus system with other bus stations or bus subscribers unidirectionally or bidirectionally, in particular in order to make process data available to the bus system und/or to receive process data from the bus system.

Often sensors and actuators are directly connected to a control or evaluation unit via an analog 4-20 mA signal. Using this approach, a separate two-wire cable is necessary for each link between a sensor or actuator and the control or evaluation unit. In addition an input/output circuit (I/O) in the control or evaluation unit (such as a PC or SPS) must be provided for each sensor and actuator. In order to keep the wiring overhead as small as possible, i.e. in order not to have to connect each sensor or actuator to be driven individually via a separate wiring link to the control or evaluation unit, the individual bus stations (such as sensors, actuators, control unit, gateway etc.) are connected among each other via a common cable infrastructure—a so-called bus (Binary Utility System) thus reducing as far as possible the wiring overhead.

In the field of filling level measurement, in particular so-called field bus systems are used. A field bus usually combines components of actorics or sensorics (such as field devices) on the one hand with a control computer on the other hand. For this purpose process data are detected by the sensorics, transmitted via the field bus to the control computer and evaluated there. As a result of the evaluation process, the data are transmitted back from the control computer to the stations of the actorics which then provide feed-back control to the process to be monitored. This data exchange is mostly achieved on a digital basis. It is also possible to calibrate or otherwise manipulate the field devices coupled to the bus system via the bus system, for example in order to put a field device in a particular operating mode.

It is to be noted that a bus station in the sense of the present invention may also be called a bus subscriber or generally a field device. Such a bus station has a primary function such as measuring process data or environmental conditions. For example, the filling level of a filling matter in a vessel or tank can be obtained through a filling level measuring apparatus. The value representing the filling level is then transmitted to a process control or the like via a bus.

BACKGROUND OF THE INVENTION

A problem with this kind of networking of devices or bus stations with each other, however, is the possibility for monitoring or diagnosing the system in the case of a malfunction or for optimising the system. There is thus a need to monitor such bus systems, to diagnose malfunction conditions and to allow or facilitate optimisation of the bus system.

In U.S. Pat. No. 4,817,080 A a monitoring system for a local area network has a distributed organization, in which a monitor manager on the network receives information from individual monitor units connected to different buses of the local-area network. Each monitor unit employs a plurality of counters in a packet memory that are dynamically allocated to specific packet characteristics as new packet characteristics appear on the network. A look-up table contains the association between counters and the characteristics with which they are associated, and a look-up engine operates the look-up table in such a manner as to enable it to search for the location of specific counters by employing a binary-search method. In this way, all processing for a given packet can be performed within the minimum packet time.

JP 05 130 108 A discloses a bus type local area network monitor equipment. The purpose of this monitor equipment is to connect monitor and control for a bus type local area network even when a tap transceiver connecting to a bus type local area network monitor is not available due to a fault or the like. The known monitor is provided with tap transceivers connected to a bus, plural interface circuits exchanging monitor information and control information of the bus type local area network and a selection circuit selecting one interface circuit optionally from the plural interface circuits. The monitor and control of the bus type local area network are implemented by sending/receiving the monitor information and the control information of the bus type local area network via the tap transceivers selected and connected by the selection circuit.

FR 2 691 029 A1 refers to remote surveillance and maintenance for digital transmission systems. The network interconnects to subscriber terminals with other subscriber terminals, by two bus networks. Two terminals are interconnected by a communication network. Two network terminals control operations. A remote testing of protocol carried out by an analyser connected to one of the terminals by a bus network, and by the addition of a specialist terminal to sample the protocol. The advantage of such a remote surveillance and maintenance appears to be that remote testing of network does not need qualified personnel or could not to go to side, and therefore is cost effective. Such a method serves also to transport protocols for example X25 and to ISO/OSI. A bus monitor circuit for switching system and a method for monitoring is disclosed in EP 0 601 768 A2. Here, a bus interface is connected to a data bus for receiving a copy of every packet on the data bus. An error detector determines whether the received packet contains an error, and produces an error detect signal and an error check result, if the receiver packet is determined as having an error. In response to the error detect signal, the received packet, the error check result and time-off-day data are stored into a register and transfer to one of the storage locations of a memory to keep a list of error records. A maintenance station reads stored error records form the memory for identifying the source of errors. WO 96/38792 A1 discloses an apparatus for monitoring and controlling data flow in a computer network device having a plurality of parts comprising control means for directly linking ports together on the basis of additional information stored in the control means whereby incoming packets are lined directly to an output port to achieve high performance. The additional information is stored in one or more look-up tables in addition to the normal CAM with the or each table addressed by separate processing. This allows the implementation to be in hardware rather than in software.

WO 98/14852 A1 discloses an interface between a remote communication network and a process control system. The interface includes a storage device, a communication software stack and a user software layer. The user software layer enables interfacing between the remote communications network and the process control system by directing the communication software stack to operate into process control system using a process communication protocol, by monitoring the message traffic on the communication software stack, and by copying requested message traffic to the storage device. The user software layer also includes media interface software that allows access to the storage device by the remote communications network to deliver specific data to a device connected to the remote communications network. WO 00/52579 A1 discloses a bus system with a master and several slaves which are linked by a bus line. Between the master and the slaves at least one repeater is inserted. According to the unit disclosed therein, a monitoring unit is connected to the bus line which detects and evaluates the reaction times between sending a master call and the receipt of a slave response. In DE 198 52 276 A1 a method for receiving a message via a serial data bus is disclosed. The method involves monitoring the data bus to identified start information for a first sub-message, receiving the first sub-message, starting a timer at the start of reception of the first sub-message; comparing the timer actual value of a first threshold value and monitoring data bus for the presence of the further start information of a further sub-message if a certain timer criterion is fulfilled. This document refers also to a functional unit for receiving messages over a serial data bus and a local network with functional units. In EP 1 049 292 A2 a system and method for network monitoring is disclosed. An algorithmic snoop unit snoops interleaved transactions over a shared bus as data is transmitted via transactions between clients coppered to shared bras, and executes various algorithms upon data snooped from the transactions. The unit includes one or more algorithmic entries along with an algorithmic engine. Each algorithmic entry includes a client ID register that identifies the client associated with a transaction, a starting address register and an ending address that define the address range upon which an algorithm will be executed, a read or write flag that identifies whether the transaction is a read or write operation, an encryption key register for holding an encryption key, a decryption key register for holding a decryption key, and algorithm ID register for identifying an algorithm to be executed, a status-control register which holds various status and control, an accumulator for accumulating results from the execution of the algorithm, a temporary storage area, and one or more memory pointers that index a location in memory for results comprising a large amount of data. If a match is found, the algorithm identified by the algorithm ID register is executed upon the data carried by the transaction. Furthermore, JP 2 002164899 A discloses a network monitoring method and its equipment. The problem to be solved is to provide a network monitoring method and its equipment for finding and taking a countermeasure against disguise of a device. To solve that problem the network monitoring equipment is provided with a topologic memory part which stores topological information of the network, a response time memory part which stores obtained response time of the execution of response inspection command, and a decision part which decides the consistency between topological information stored in the topologic memory part and the response time stored in the response time memory part, and it finds and takes a countermeasure against disguise of a device in the network like IEEE1394 by which such topology can be obtained.

If in such bus systems there are communication problems between one or more sensors or actuators and the control unit, the analysis of such problems involves considerable complexity, if a problem of this sort can be solved at all. In these instances a conventional multipurpose meter is only rarely able to provide information on the cause of a faulty communication. Often the only remaining possibility is to carry out monitoring or diagnosis of the bus system using additional external, often very expensive, equipment. For this purpose, often so-called bus monitors are connected to the bus system as purely passive and external devices in order to facilitate monitoring or diagnosis in the case of a malfunction.

The bus monitor is a relatively passive device and does not actively participate in the communication of the bus system. Its task is rather to "listen in" to any data traffic of the bus system and to store it in a memory dedicated for this purpose. In order to be able to find and identify the thus stored data at a later time of diagnosis, each individual data telegram is stored in the memory of the bus monitor with a time stamp and/or an index. Often such bus monitors have their own display or screen allowing to display directly and on-line the detected data traffic. In principle, there is also the possibility to retrieve the data previously recorded and stored in memory in order to analyse them off-line at a later point in time.

Such bus monitors also often comprise a filter function allowing complex systems in particular to pre-sort and store the telegram traffic of the bus system according to certain filtering criteria. With such filters an essential distinction is made between "on-line filters" and "off-line filters". An on-line filter is a filter that evaluates the telegrams established on the bus system already during recording—i.e. on-line—however, records only those which fulfill a certain filtering rule. The advantage of an on-line filter is a reduction of the data volume to be stored; a disadvantage is, however, that possibly relevant telegrams are lost in the filtering process, resulting in incomplete recordings. Off-line filters, on the other hand, are filters that analyse data from previous recordings, allowing the data to be presented in a more structured manner. The advantage of such off-line filters is that only the data can be presented that are interesting at the moment of analysis; if needed, however, an overview over the entire data may also be selected. A disadvantage of such off-line filters is that they always cause very high data volumes.

As mentioned above, the previously described bus monitors must be connected as additional devices to the existing bus system. By externally connecting these bus monitors to the bus system as passive devices, there is a danger that, as a side effect, they will influence the bus system as a consequence of changed electrical characteristics of the overall system, which can then lead to faulty diagnoses.

A further disadvantage of such external passive bus monitors is that they cannot achieve long-term diagnoses since they cannot continuously remain within the bus system. Extensive trouble shooting is therefore often not possible since the bus monitors are not integrated in the bus system at the point in time when a malfunction occurs.

Moreover, such external bus systems are not suitable for error diagnosis because they only detect the local data traffic at the place where the bus monitor is connected. Global monitoring, however, is not possible. Each individual bus station's data traffic behind its bus interface is therefore not detectable by an external bus monitor, i.e. malfunctions in the communication within the bus station remain undetected.

SUMMARY OF THE INVENTION

The present invention is thus based on the problem of achieving improved bus monitoring for trouble shooting or system diagnosis.

This problem is solved according to a first aspect of the invention by a newly designed bus station such as a sensor, an actuator, a control unit or a gateway, etc. combining the primary function of each device with a secondary function, i.e. the bus monitor function, by integrating a bus monitoring means in the bus station. In the context of the present invention, the primary function refers to the main purpose of each bus station, i.e. the device to be coupled to the bus for which it is used. For example, the primary function of a sensor is to detect physical processes and to convert them into electrical or digital signals that may be further processed and evaluated. According to the invention, each bus station, apart from this primary function, also uses the bus interface, already present for the purposes of process data communication, to carry out the monitoring of the bus system as a secondary task.

In order to detect the data telegrams on the bus system in the form of monitor data for the second function, a bus monitoring means is integrated in the bus station. For this purpose the software of the bus station may also be extended to provide the function of detecting these data telegrams.

Apart from the above-mentioned possible extension of the existing software, it is also possible to integrate a dedicated software to detect the data telegrams in the bus station. In order to be able to retrieve the thus detected monitor data, for example in an off-line operation, the bus monitor means may be complemented by a telegram memory where telegrams are stored, ideally provided with a time stamp and/or index. According to the invention, the bus system is therefore not negatively affected by such a novel bus station with bus monitor means, and therefore the data traffic of a bus station occurring within the station, "behind" each bus interface of the individual bus station, may also be monitored.

It may turn out to be particularly advantageous to provide all bus stations present in a bus system with the integrated bus monitor function according to the present invention, since this would allow all monitor data obtained at any point of the system to be made available at any time and at any other point in the system. This retrieval of the previously stored data may be carried out via the functions defined in the bus system, such as FTP, Telnet or HTTP in the case of an Ethernet or the internet.

A further advantage of the integration of the bus monitor function in a bus station is that it ensures that a negative effect due to modified electrical characteristics of the overall system are avoided since each bus station permanently stays within the system. Another advantage of the integration of the bus monitor function in a bus station is that, by permanently maintaining the bus station within the bus system, long-time diagnoses become possible enabling an investigation into a malfunction's potential cause.

In order to visualize the data obtained by the integrated bus monitor function of the present invention, each bus station can comprise a display or screen according to a further exemplary embodiment of the present invention, allowing the detected data traffic to be displayed either on-line or off-line. Another approach for retrieving the data obtained by the bus monitor function according to another exemplary embodiment of the present invention accesses the stored data with the aid of communication software via the bus system. This retrieval of the previously stored data is preferably carried out via the functions defined in the bus system, such as FTP, Telnet or HTTP in the case of an Ethernet or the internet.

These functions allow accessing the obtained monitor data across a plurality of communication layers. For field devices having a further interface, such as a configuration interface, as well as the bus interface, it is possible to read out the recorded monitor data through this further interface: This extension also allows diagnosis and monitoring of the telegram traffic of each bus station with the bus system even when no communication can be established between the bus system and the bus station due to a damaged data line, for example.

Visualizing the data obtained (stored) by the bus monitor function may be done alternatively, according to a further exemplary embodiment of the invention, in a form intelligible to the user (e.g. text or html file) and/or, according to a preferred exemplary embodiment of the invention, in machine readable form (e.g. binary coding). These different forms of visualisation are particularly advantageous in that, depending on the target user group, different types of presentation may be chosen. While specialists usually prefer a machine readable representation in which the arising data traffic is read on the bus system on a byte per byte basis in machine readable form and displayed as hexadecimal numbers, service technicians usually prefer a more easily accessible presentation in which the telegrams are on the one hand clearly segregated as requests and answers and on the other hand "translated", i.e. are presented in a form intelligible to the user, for example as a text or HTML file.

If needed, the bus stations of the present invention according to a preferred exemplary embodiment comprise a filter in each of their bus monitor means useful for filtering the detected data. Such a filtering function allows the deliberate presentation of certain telegram types (i.e. using a command filter) or the presentation of telegrams of certain devices (i.e. using an address filter). By suitable filter queries the bus monitor function may continue to check the recorded telegrams for completeness or validity and, in the case of a malfunction, to indicate to the user by a suitable display that certain telegrams are invalid. For this purpose, there are suitable filtering functions so that only invalid telegrams may, for example, be shown. In order to filter out only the relevant telegrams it is also possible to filter out the detected telegrams using logic AND, AND/OR or OR combinations of filtering rules, which is essentially possible both in the on-line and the off-line operation.

As mentioned above, the data volume created by the bus monitor function is reduced by such a filtering function and therefore an on-line monitoring function is facilitated. The filtering function allows, for example, the recording of only those telegrams that are faulty when arriving at the bus station, in order to make them available to the user on-line during the running operation.

In order to facilitate long-term monitoring of the bus system using the bus monitor function, the bus monitor means has, according to an exemplary embodiment of the invention, a telegram memory of sufficient size to store the detected telegrams. Since the bus station remains within the system because of its primary function, long-term monitoring is possible. The malfunctions occurring during operation are recorded and may be read out at a later point in time either directly at the bus subscriber, via the bus system to which the bus station is coupled, via a higher level bus system, or via another interface of the bus station.

As mentioned above, an example of the bus station according to the invention is a filling level measurement device, a pressure measuring device or a temperature measuring device. The bus monitor means is integrated in these measuring devices.

SHORT DESCRIPTION OF THE DRAWINGS

In order to provide a better understanding and for further explanation of the present invention, the technical background of the invention and an exemplary embodiment of the invention are described below in more detail with reference to the accompanying drawings, in which.

Like units and functions have been designated with like reference numerals throughout the figures.

DESCRIPTION OF AN EXEMPLARY EMBODIMENT OF THE PRESENT INVENTION

Figure 1:
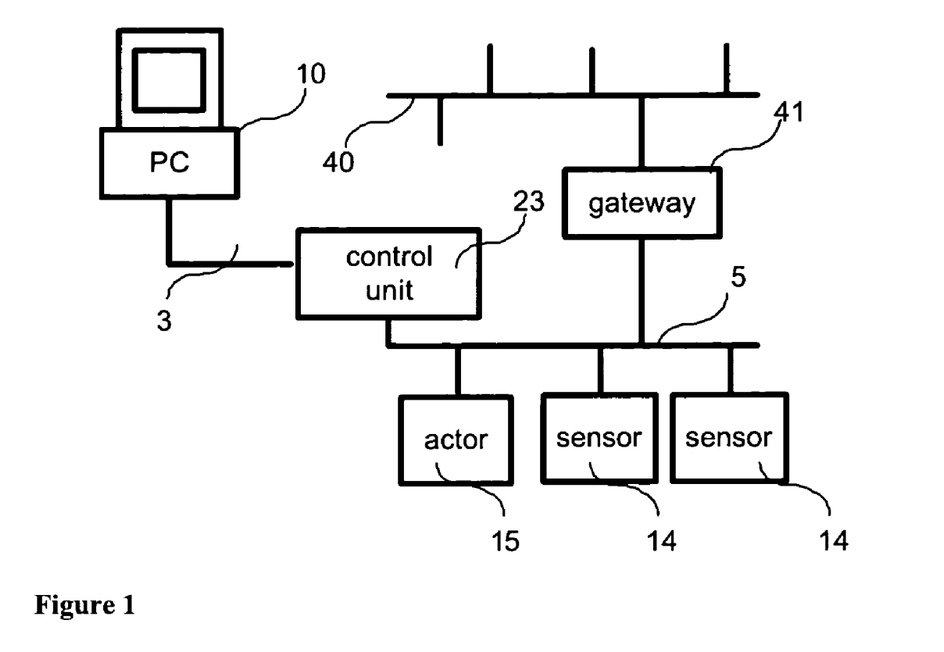
FIG. 1 shows a structure of a bus system.

FIG. 1 shows the basic structure of a first digitally communicating bus system 5 with a control unit 23, sensors 14, and an actuator 15, each connected to the control unit 23 via the digitally communicating bus system 5. Control unit 23 may be any memory programmable controller (MPC) or specifically may be, for example, the evaluation center VEGALOG 571 of the company VEGA Grieshaber KG, Germany. The first bus system 5 may be any bus system, such as Fieldbus Foundation or Hart, however, Profibus PA or VBUS of the company VEGA Grieshaber KG, Germany, have turned out to be particularly suitable. In the present embodiment, control unit 23 has a configuration interface 3, in the present case coupled to a configuration computer 10. Configuration computer 10 is a common personal computer (PC) or may be a specific configuration device.

The first bus system 5 can be optionally complemented by a second bus system 40 via a gateway 41. The second bus system 40 represents an overlapping network with respect to the first bus system 5, such as Ethernet or the Internet. This second bus system 40 is allowed to access control unit 23 or sensors 14 or actuators 15 of the first bus system 1 via gateway 41. A possible variant is to combine control unit 23 with gateway 41 to form a single device.

Figure 2:
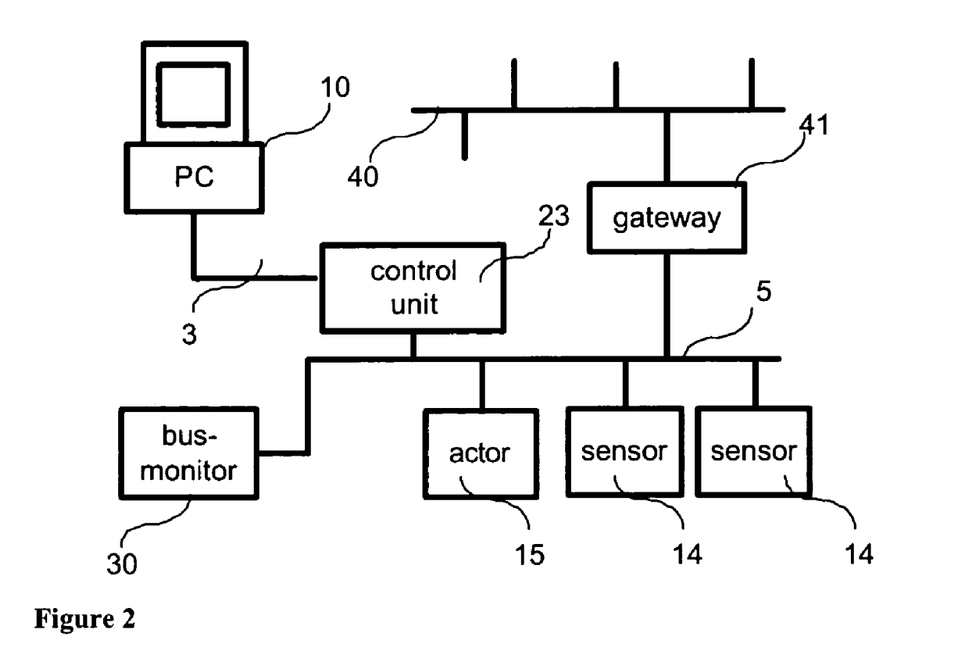
FIG. 2 shows a bus system as monitored by a bus monitor.

If problems arise in such a system with the communication between one or more sensors 14, actuators 15 and/or the control unit 23, the analysis of such a problem involves considerable effort, if the basic fault can be found at all. In such a case, a conventional multipurpose meter can only rarely provide information on the cause of the faulty communication. In that case the cause of the malfunction is usually diagnosed using external devices, which are then coupled to bus system 5 or 40. These devices for monitoring the bus system are also called bus monitors. FIG. 2 shows in exemplary form the system of FIG. 1 complemented by such a bus monitor 30. In the present case, bus monitor 30 is an additional external passive device that is additionally coupled to bus system 5.

Figure 3:
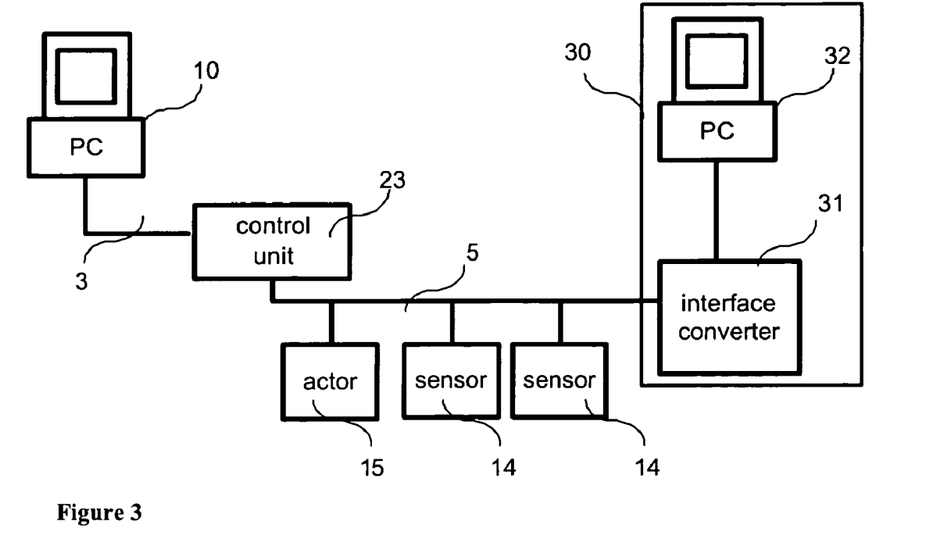
FIG. 3 shows a connection of the bus monitor of FIG. 2 with an interface converter.

Unlike bus stations 14, 15, 23, bus monitor 30 does not actively participate in data communication. Its task is to listen in to all data traffic on the bus system and to store it in the memory provided for this purpose. In order to make visible the data traffic thus recorded, bus monitor 30 is usually equipped with its own display or screen. As shown in FIG. 2, bus monitor 30 is an entirely independent device. Bus monitor 30 can, however, be configured as a mere plug-in circuit board or, e.g., as an interface converter for coupling to an RS 232 interface (COM interface) of a PC. FIG. 3 shows such arrangements with an interface converter 31 coupled to a PC 32 via an interface (e.g. RS 232). In the present case, PC 32 together with the interface converter act as a bus monitor 30.

As can be seen from the preceding figures, bus monitors 30 are always additionally connected to the existing system from the outside. These devices often have the disadvantageous side effect that they have a certain influence on the bus system. These external bus monitors, however, do not allow long term diagnoses since bus monitors 30 cannot continuously remain within the system. Often long-term trouble shooting is therefore not possible since bus monitors 30 are usually not integrated in the system at the time of the occurrence of the malfunction. In addition, an external bus monitor 30 can only detect the data traffic occurring on the data line of the bus systems. The data traffic occurring behind the interfaces of the bus stations 14, 15 and 23 to the bus system, is invisible to the bus monitor.

Figure 4:
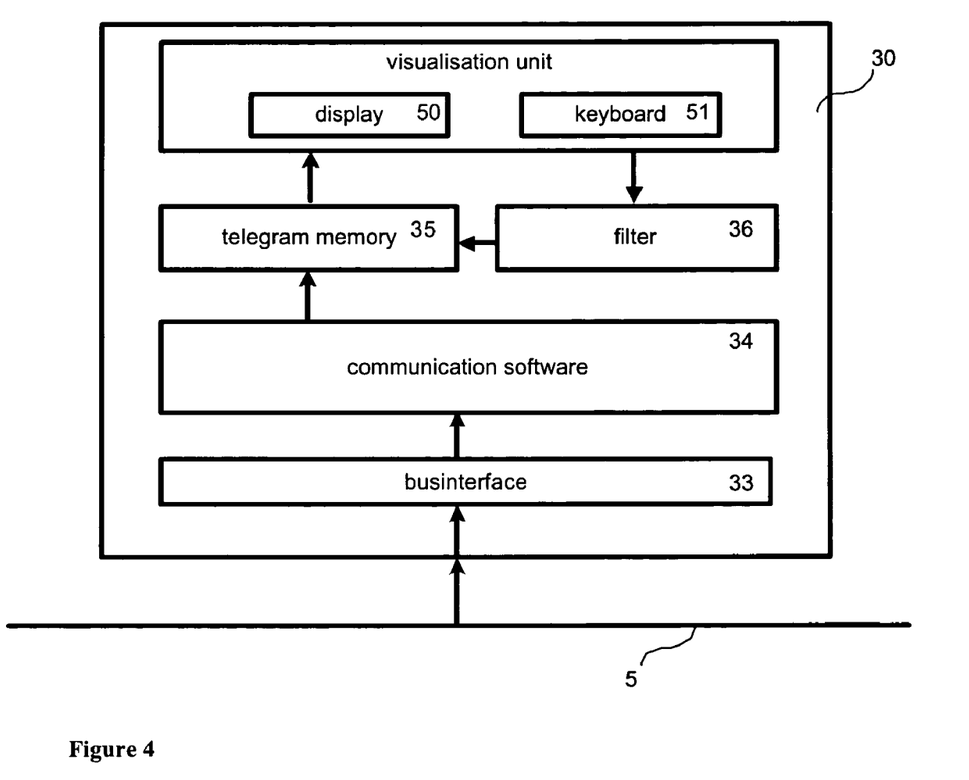
FIG. 4 shows the structure of a bus monitor.

FIG. 4 shows a functional diagram of a conventional bus monitor 30. Bus monitor 30 comprises a bus interface 33, a communication software 34, a telegram memory 35, a filter 36, and a visualising unit 21 with a display 50 and a keyboard 51. Bus monitor 30 is coupled to an existing bus system 5 via bus interface 33. In order to detect the data traffic on bus system 5, bus monitor 30 accesses this data traffic via bus interface 33 by means of communication software 34. The data traffic thus detected is then stored in a telegram memory 35 or can be directly optically represented or displayed on-line using visualising unit 21 or display 50. Alternatively, a filter 36 may be applied to the data thus obtained, in order to limit the data volume to be stored.

Figure 5:
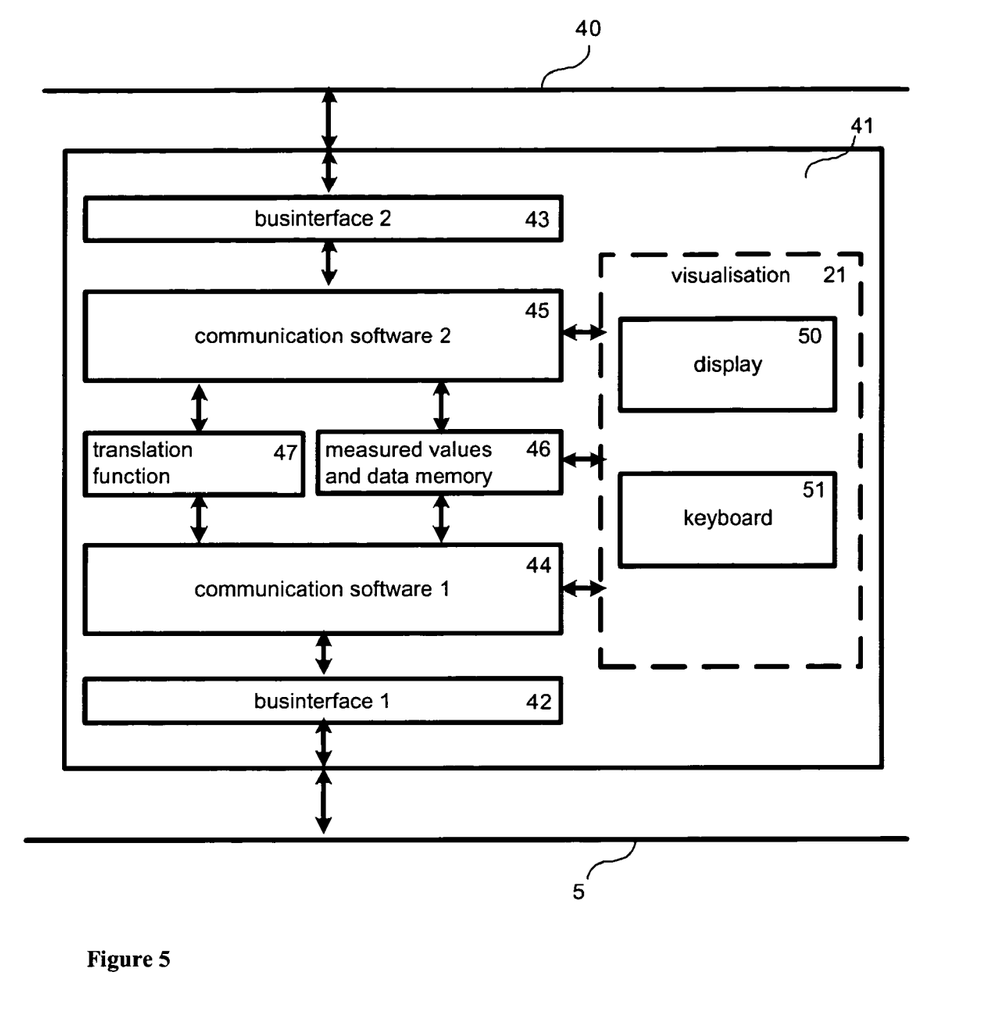
FIG. 5 shows the structure of a gateway.

FIG. 5 shows a functional diagram of a gateway 41 coupled between two bus systems 5, 40 in order to ensure communication between the two systems. Gateway 41 comprises a first bus interface 42 and a second bus interface 43, a first communication software 44 and a second communication software 45, a measuring value and data memory 46, and a function 47 which translates the data traffic of the two, usually incompatible, bus systems 5, 40. In order to access the data traffic on bus system 5 via bus system 40, the communication software 45 accesses the data on bus system 5 using the first communication software 44 and the first bus interface 42. This data traffic is detected with the aid of the first communication software 44 via the first bus interface 42. The data traffic thus detected is transformed into a format intelligible to bus system 40 with the aid of the translating function 47 and communicated to bus system 40 via bus interface 43 using the second communication software 45. Alternatively, gateway 41 comprises a visualising unit 21 with a keyboard 51 and a display 50 for displaying process data.

Figure 6:
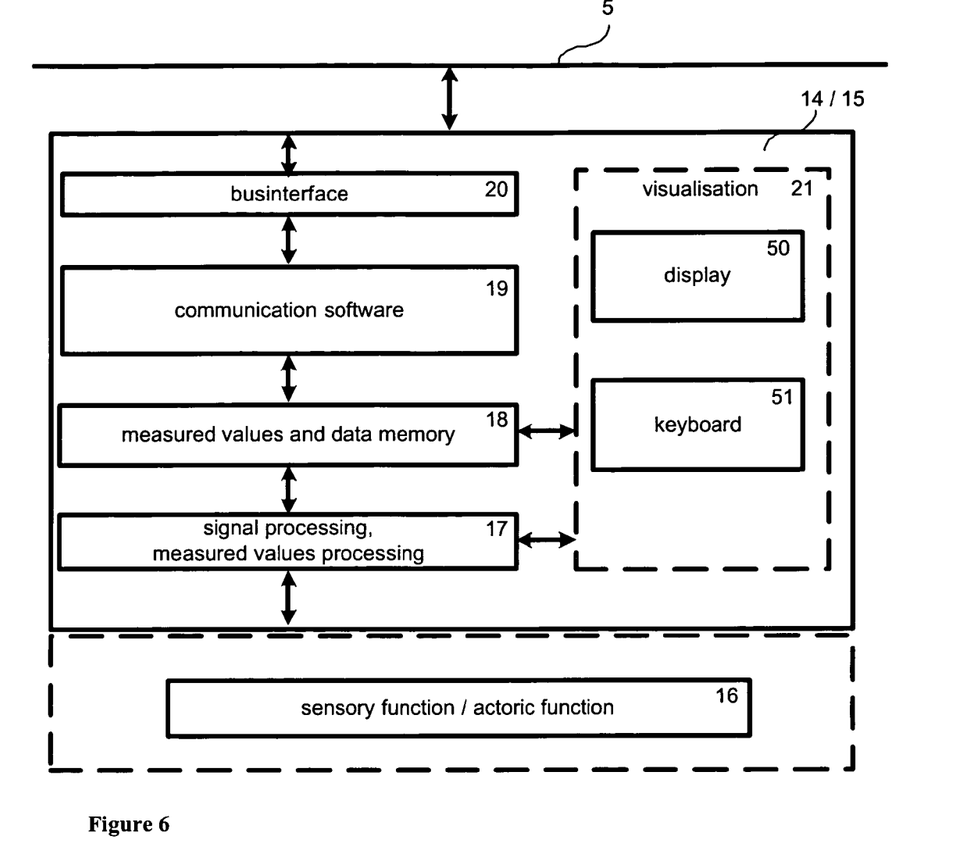
FIG. 6 shows the structure of a sensor or actuator.

The functional diagram of FIG. 6 shows the basic structure of a sensor 14 or actuator 15. Sensor 14 and actuator 15 comprise sensorics and actorics 16, respectively, a signaling and processing unit 17, a measuring value and data memory 18, a communication software 19 and a bus interface 20. For example in the case of a sensor 14, the sensorics 16 receive a signal to be further processed. This signal is further processed by the signalling and processing unit 17 and transformed, for example, into a format intelligible to the communication software 19. The data thus transformed may be latched by measuring value and data memory 18. Then the transformed data are communicated by the communication software 19 to bus system 5 via bus interface 20. Alternatively, sensor 14 or actuator 15 comprises a visualising unit 21 with a keyboard 51 and a display 50 for displaying process data.

Figure 8:
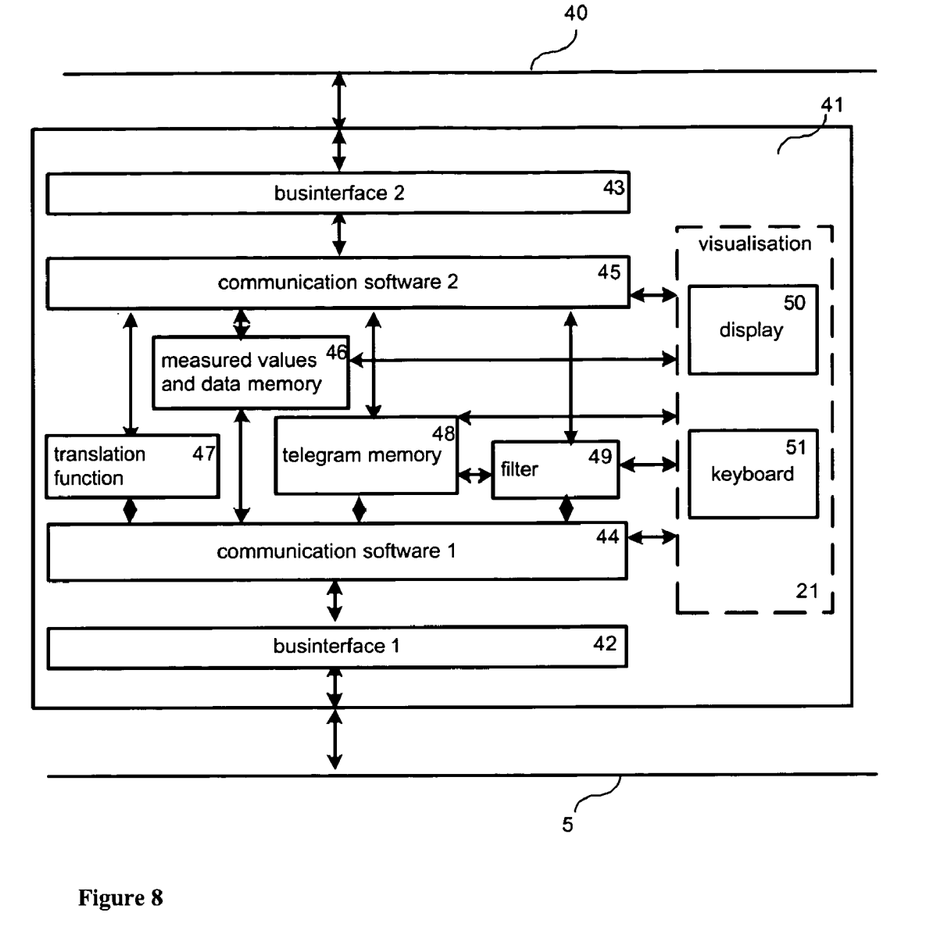
FIG. 8 shows the structure of a gateway with integrated function according to the present invention.
Figure 9:
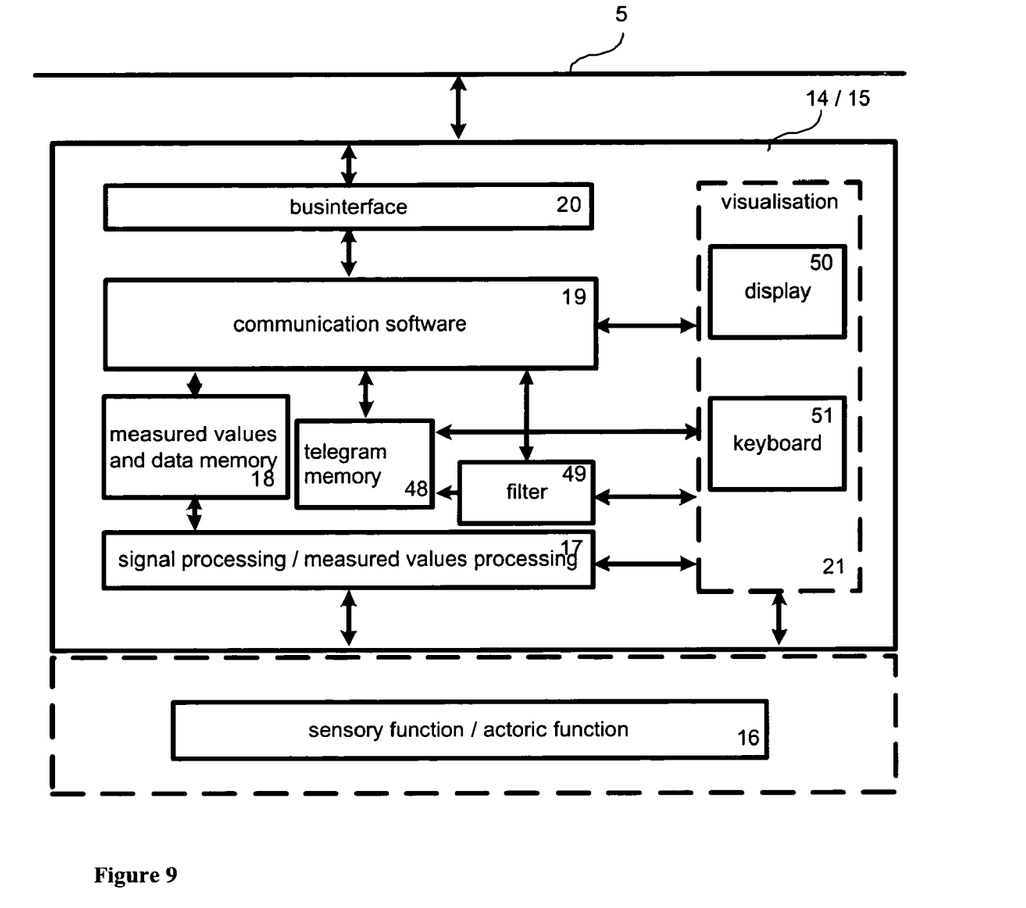
FIG. 9 shows the structure of a sensor or actuator with integrated bus monitor function according to the present invention.

The invention is based on the idea of combining the primary function of gateway 41 of FIG. 5 or sensor 14 or actor 15 of FIG. 6 with the function of a bus monitor 30 of FIG. 4 to provide a new device with combined functions of gateway and bus monitor functions of FIG. 8 or sensor or actor and bus monitor functions of FIG. 9.

According to the invention, the system control unit 23, sensor 14, actuator 15 or gateway 41 devices, which are called bus stations in the context of the present invention, employ their system immanent hardware components, in particular each bus interface, not only for the primary task of the exchange of process data and measuring values, but also utilize the same hardware components, in particular each bus interface, for realizing a secondary task, namely the bus monitor function. Implementing the bus monitor function is done in the bus stations by complementing each bus station with a bus monitor means 30.

Figure 7:
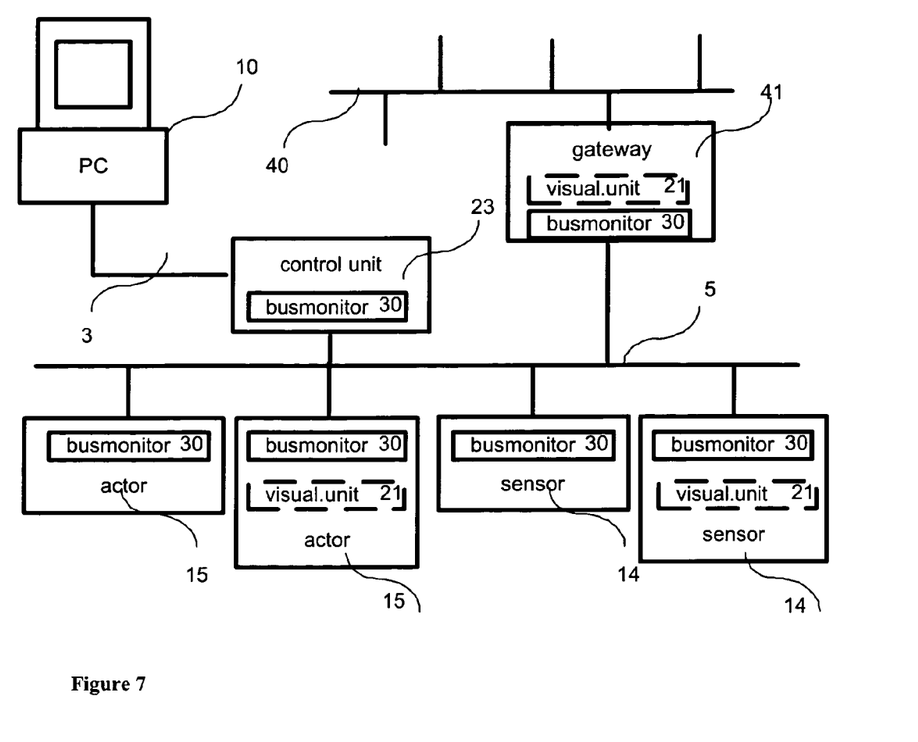
FIG. 7 shows the structure of a bus system with a bus monitor function integrated with the bus station according to the invention.

FIG. 7 shows the basic structure of a first digitally communicating bus system 5 having a control unit 23, sensors 14, and actuators 15, each linked to the control unit 23 via the digitally communicating bus system 5. Optionally, bus system 5 is coupled to a second bus system 40 via gateway 41. The control unit 23 can be any memory programmable controller (MPC) or in particular the evaluation center VEGALOG 571 of the company VEGA Grieshaber KG, Germany. The first bus system 5 may be any bus system, such as Fieldbus Foundation or Hart, while Profibus PA or VBUS of the company VEGA Grieshaber KG, Germany, have proven to be particularly suitable.

According to the invention, control unit 23, sensors 14, actuators 15 and gateway 41 each comprise an integral bus monitor means 30. The system of FIG. 7 thus corresponds to the system of FIG. 1, except for the inventive addition of bus monitor means 30 to each bus station, i.e. control unit 23, sensor 14, actuator 15 and gateway 41.

In this embodiment, control unit 23 has a configuration interface 3 to which a configuration computer is coupled. The configuration computer 10 can be a common personal computer (PC) or a specific configuration device. In the context of the present invention, however, it has proven to be particularly suitable, to provide such a configuration interface also with the other bus stations 14, 15, 41. A configuration interface of this type allows the reading out of the monitor data obtained even if, due to a damaged data line, a contact may not be established, for example, between a bus station 14, 15, 41 and the bus system.

The first bus system 5 is complemented by a second bus system 40 via a gateway 41. The second bus system 40 represents an overlying network with respect to the first bus system 5, such as an Ethernet or the internet. The second bus system 40 is allowed to access the control unit 23 or the sensors 14 or the actuators 15 of the first bus system 5 via the gateway 41. In a possible variant, control unit 23 and gateway 41 are combined in one device.

Networking of the individual bus stations 14, 15, 41 among each other and even across several layers 5, 40, allows for the data obtained by the bus monitor means 30 to be made available to the entire system. All monitor data derived at any position are available at any other place of the system and at any point in time. Accessing the monitor data is done using system immanent functions, such as FTP, Telnet or HTTP in the case of an Ethernet or the Internet. With the aid of these functions access across several communication layers is possible.

Since the monitor data may be retrieved by means of the communication software of each addressed bus station, it is possible to carry out monitoring operations, for example, via bus system 40, via gateway 41, via bus system 5 with sensor 14 or actuator 15, namely in a way in which sensor 14 or actuator 15 receives the telegrams of bus system 5. Bus system 5 is not affected in any way since sensor 14 or actuator 15 are always present in the system also during "normal" operation.

The converse approach is also possible in which monitoring operations of bus system 40 are carried out via control unit 23, via bus system 5 from within gateway 41. This results in the possibility of finding the cause of a malfunction with an inoperative subscriber on the bus system.

FIG. 8 shows a functional diagram of a gateway 41 coupled between two bus systems 5, 40 in order to ensure communication between these two systems, and complemented by the inventive bus monitor means. The gateway comprises a first bus interface 42 and a second bus interface 43, a first communication software 44 and a second communication software 45, a measuring value and data memory 46, and a function 47 for translating the data traffic of the two, usually incompatible, bus systems 5, 40. In addition, gateway 41 is complemented by a data filter 49 and a telegram memory 48. In order to access the data traffic on bus system 5 via bus system 40, the communication software 45 accesses the data on bus system 5 via the first communication software 44 and the first bus interface 42. This data traffic is detected via the first bus interface 42 with the aid of the first communication software 44. The data traffic thus detected is converted into a format intelligible to bus system 40 with the aid of the translation function 47 and communicated to bus system 40 by the second communication software 45 via bus interface 43.

It is now possible according to the present invention to carry out monitoring of the bus systems 5, 40 or the gateway itself with the aid of gateway 41. In order to detect the telegram traffic on bus system 5 or 40, gateway 41 accesses said telegram traffic via bus interface 42 or 43 by means of communication software 44 or 45. The data traffic thus detected may then be filtered and stored in telegram memory 48 or may be directly optically visualized on-line using visualising unit 21 or display 50.

FIG. 9 shows the basic structure of a sensor 14 or actuator 15 in a functional diagram according to the present invention. Sensor 14 or actuator 15 comprise sensorics or actorics 16, a signalling or processing unit 17, a measuring value and data memory 18, a communication software 19 and a bus interface 20. Sensor 14 or actuator 15 are also complemented by a data filter 49 and a telegram memory 48. In the case of a sensor 14, the sensorics 16 receive, for example, a signal to be further processed. Said signal is further processed by the signalling and processing unit 17 and converted, for example, into a format intelligible to the communication software 19. The data thus converted may also be latched by the measuring value and data memory 18. Then the converted data are communicated to bus system 5 by the communication software 19 via bus interface 20.

It is now possible according to the present invention to carry out monitoring of bus systems 5, or of sensor 14 or actuator 15 itself, with the aid of sensor 14 or actuator 15. In order to detect the data traffic on bus system 5, sensor 14 or actuator 15 accesses said data traffic via bus interface 20 by means of communication software 19. The data traffic thus detected may then be filtered and stored in telegram memory 48 or may be directly optically visualized on-line using visualising unit 21 or display 50.

Figure 10A:
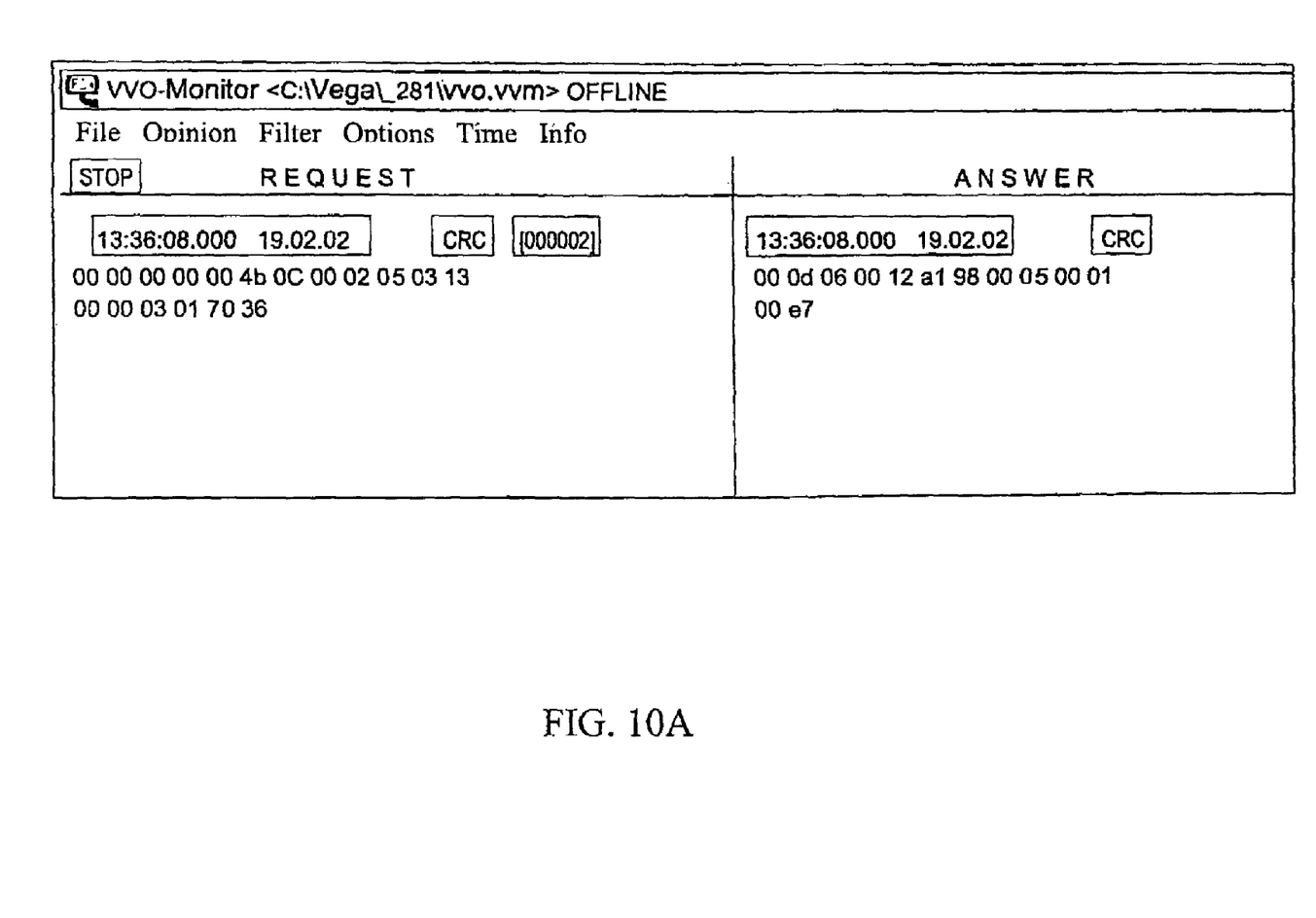
FIGS. 10a-c show possible displays of the monitor data.
Figure 10B:
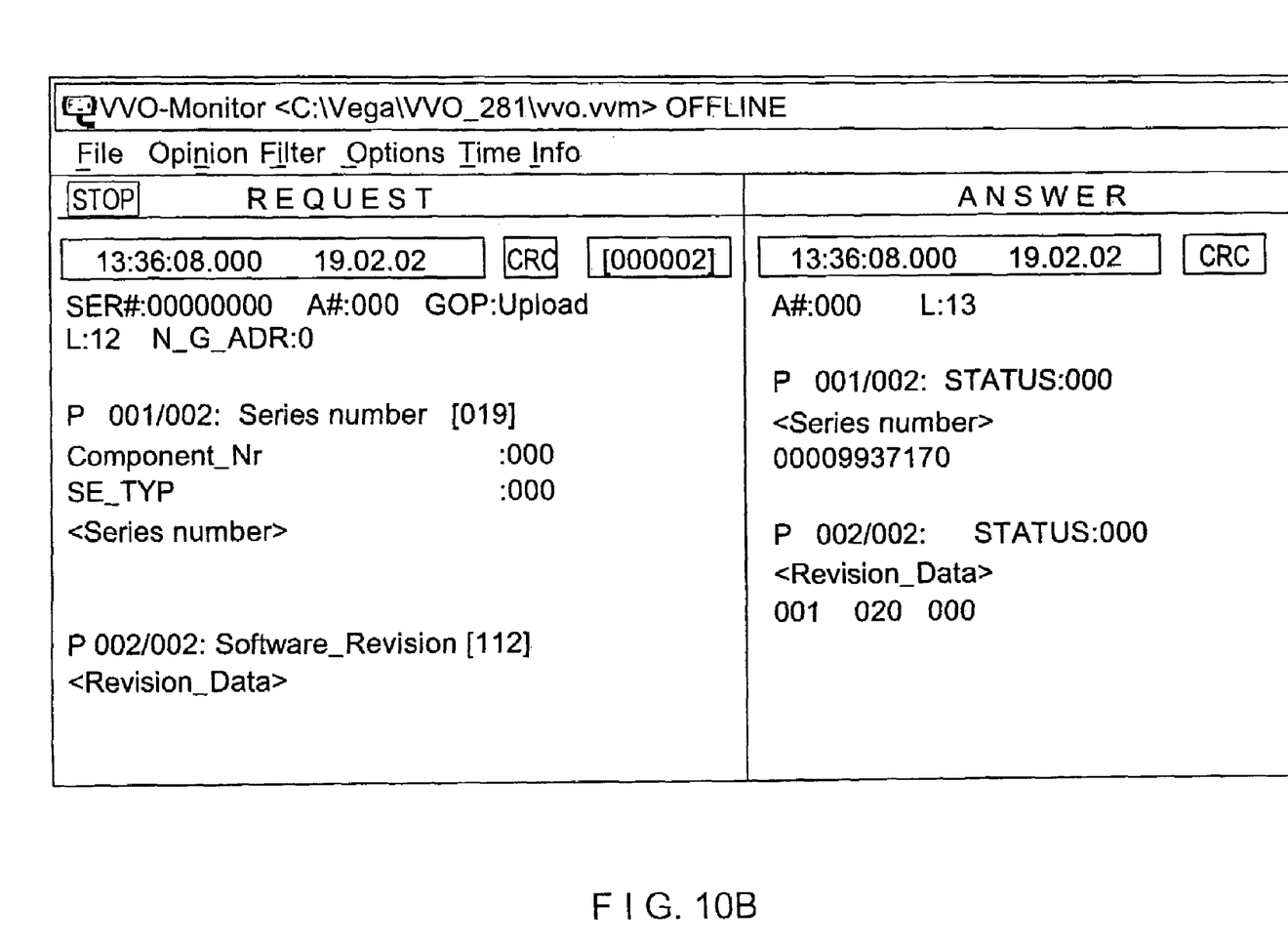
Figure 10C:
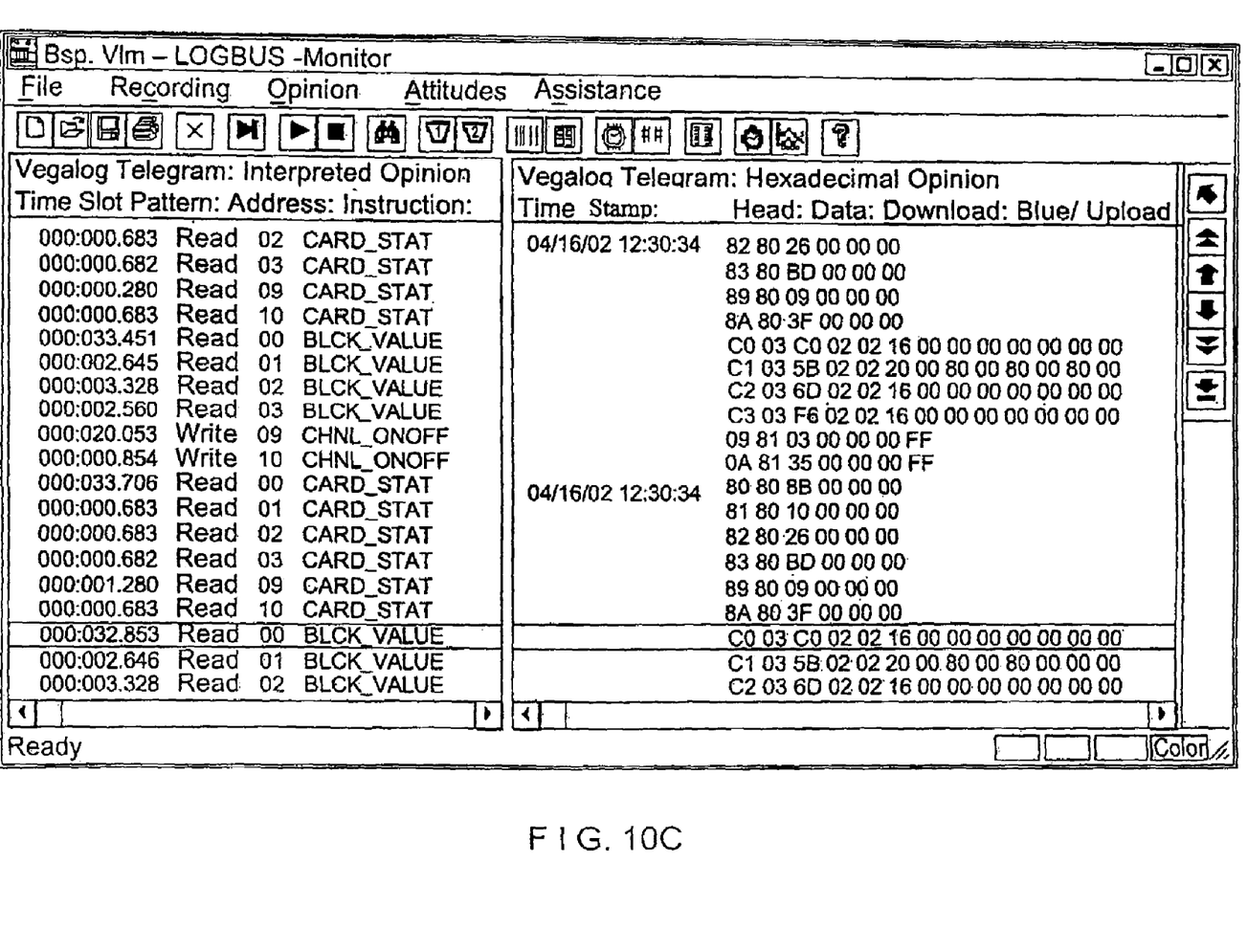

FIGS. 10a-c show various possible displays of the monitor data obtained with the aid of the integrated bus monitor function. As mentioned above, visualizing the data obtained (stored) with the aid of the bus monitor function can alternatively be done in a form intelligible to the user (e.g. text or HTML file) and/or, according to another preferred exemplary embodiment of the invention, in a machine readable form (e.g. binary coding). FIG. 10a shows the data traffic detected by the monitor function read-in by a bus system on a byte by byte basis, in hexadecimal numeric representation, segregated in requests and answers at a given point in time. A more accessible representation of the monitor data is shown in FIG. 10b where the detected data are visualized in "translated" form. Since depending on the target group of users different ways of representation are preferred, it is possible to switch over from the representation of FIG. 10a to that of FIG. 10b. Another possible representation is shown in FIG. 10c. This is a combination of the modes of representation shown in FIGS. 10a and 10b, where both the hexadecimal and the "translated" representation are displayed side by side.

Figure 11:
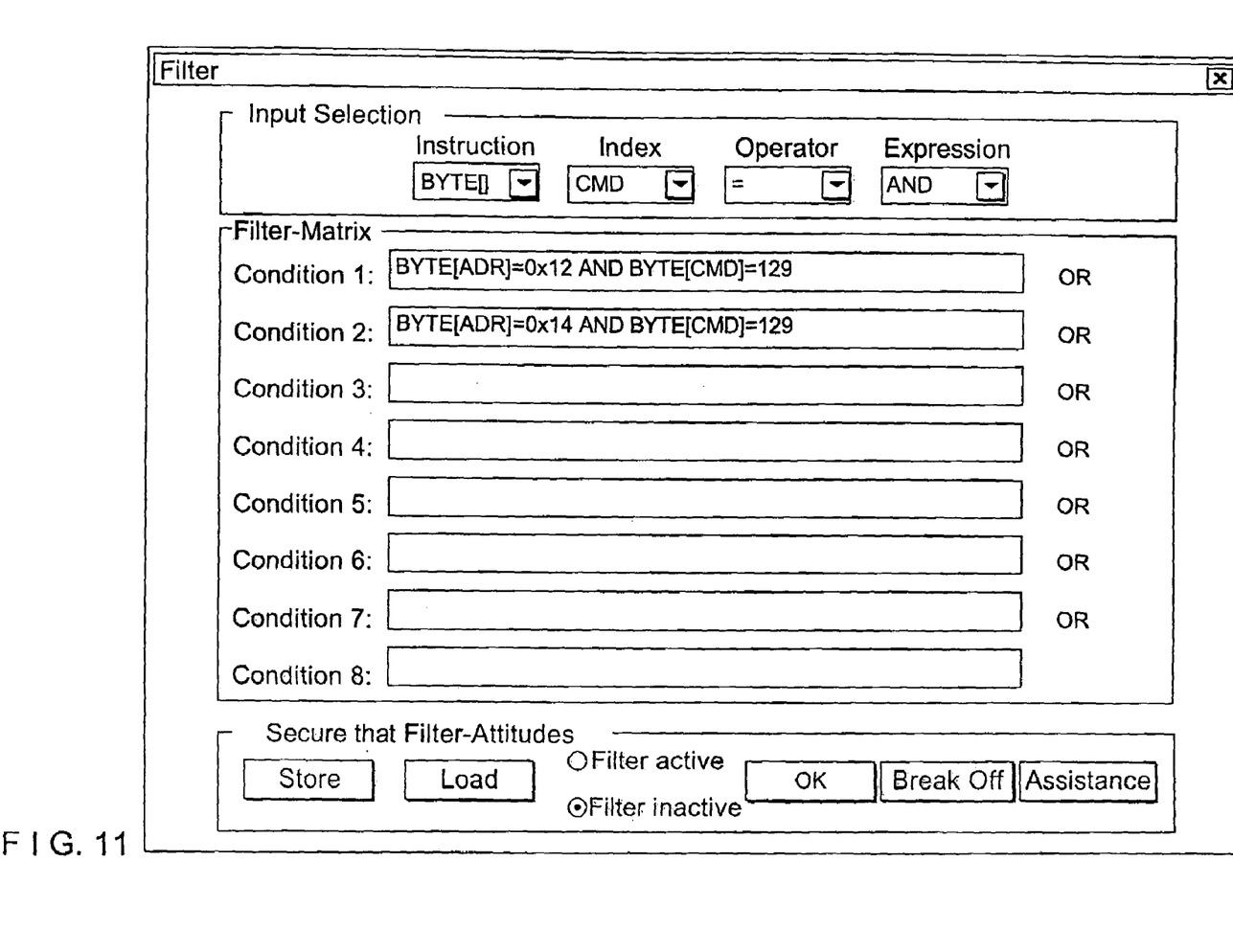
FIG. 11 shows a user interface for defining filter criteria.

FIG. 11 shows a user interface for defining filtering criteria in order to only detect certain data. With the aid of this user interface certain filtering conditions, such as command filtering conditions and/or address filtering conditions, may be defined (conditions 1 to 8), and combined with each other using logic operators, where each filtering condition (such as condition 1) may consist of a number of conditions, in turn logically combined with each other.

The invention claimed is:

1. A bus station, comprising:
   a measurement arrangement generating measurement data;
   at least one bus interface communicating with a bus system; and
   a bus monitor arrangement coupled to the bus interface,
   wherein the bus station performs at least one of: monitoring a communication between the bus station and the bus system via the bus interface and monitoring an internal communication within the bus station, and wherein the measurement arrangement includes at least one of a sensor and an actuator.

2. The bus station according to claim 1, wherein the at least one of the sensor and the actuator generates a measurement signal.

3. The bus station according to claim 2, wherein the measurement arrangement includes a signal processor generating the measurement data as a function of the measurement signal.

4. The bus station according to claim 1, further comprising:
   a memory storing the measurement data.

5. The bus station according to claim 1, wherein the at least one bus interface transmits the measurement data to a computing device on the bus system.

6. The bus station according to claim 1, further comprising:
   a display displaying at least one of (i) the measurement data, (ii) a graphical representation of the communication between the bus station and the bus system over the bus interface and (iii) the internal communication within the bus station.

7. The bus station according to claim 6, wherein the graphical representation is one of text, HTML, binary coding and hexadecimal numeric representation.

8. A gateway device, comprising:
   a first bus interface communicating with a first bus system;
   a second bus interface communicating with a second bus system; and
   a bus monitor arrangement coupled to the first and second bus interfaces,
   wherein the bus monitor arrangement produces monitor data corresponding to at least one of (i) communications between the gateway device and the first bus system via the first bus interface, (ii) communications between the gateway device and the second bus system via the second bus interface and (iii) internal communications within the gateway device.

9. The gateway device according to claim 8, wherein the first bus interface communicates with the first bus system according to a first communication format, and the second bus interface communicates with the second bus system according to a second communication format.

10. The gateway device according to claim 9, further comprising:
    a translator translating communications from one of the first and second formats to the other of the first and second formats.

11. The gateway device according to claim 8, further comprising:
    a display displaying a graphical representation of the monitor data.

12. The gateway device according to claim 11, wherein the graphical representation is one of text, HTML, binary coding and hexadecimal numeric representation.

13. The gateway device according to claim 8, further comprising:
 a memory storing the monitor data.

14. The gateway device according to claim 13, wherein the first and second bus interfaces provide access to the monitor data for computing devices on the first and second bus systems using a predefined protocol.

15. The gateway device according to claim 14, wherein the predefined protocol is one of FTP, Telnet and HTTP.

16. A method, comprising:
 generating measurement data using a measurement arrangement;
 storing the measurement data in a memory;
 providing access to the measurement data for a bus system using at least one bus interface; and
 monitoring the access to the measurement data using a bus monitor arrangement being implemented in the measurement arrangement,
 wherein the measurement arrangement includes at least one of a sensor and an actuator.

17. The method according to claim 16, further comprising:
 generating a measurement signal by the at least one of the sensor and the actuator; and
 processing the measurement signal to generate the measurement data.

18. The method according to claim 16, further comprising:
 displaying at least one of (i) the measurement data and (ii) a graphical representation of the access to the measurement data.

* * * * *